(12) United States Patent
Matsuoka et al.

(10) Patent No.: US 8,068,477 B2
(45) Date of Patent: Nov. 29, 2011

(54) WIRELESS BASE STATION AND MOBILE STATION

(75) Inventors: Hideki Matsuoka, Kawasaki (JP); Norio Tomiyoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 347 days.

(21) Appl. No.: 11/652,022

(22) Filed: Jan. 11, 2007

(65) Prior Publication Data

US 2007/0286150 A1 Dec. 13, 2007

Related U.S. Application Data

(63) Continuation of application No. PCT/JP2004/010131, filed on Jul. 15, 2004.

(51) Int. Cl.
*H04B 7/212* (2006.01)

(52) U.S. Cl. ........................ 370/347; 370/238

(58) Field of Classification Search .......... 370/347–350, 370/442
See application file for complete search history.

(56) References Cited

U.S. PATENT DOCUMENTS

| | | | | |
|---|---|---|---|---|
| 6,647,246 B1* | 11/2003 | Lu | .............................. | 455/67.11 |
| 6,947,734 B1* | 9/2005 | Toubassi | ...................... | 455/423 |
| 2001/0024429 A1 | 9/2001 | Sekine | | |
| 2002/0049536 A1* | 4/2002 | Gaal | ............................ | 701/213 |
| 2002/0054611 A1* | 5/2002 | Seta | .............................. | 370/329 |
| 2003/0076874 A1* | 4/2003 | Li et al. | .......................... | 375/145 |
| 2003/0210713 A1* | 11/2003 | Abdel-Ghaffar | ............... | 370/341 |
| 2004/0008138 A1* | 1/2004 | Hockley et al. | .......... | 342/357.09 |
| 2004/0008646 A1 | 1/2004 | Park | | |
| 2004/0151152 A1* | 8/2004 | Kim et al. | ..................... | 370/342 |
| 2006/0009210 A1* | 1/2006 | Rinne et al. | .................... | 455/423 |
| 2006/0267841 A1* | 11/2006 | Lee et al. | ....................... | 342/463 |

FOREIGN PATENT DOCUMENTS

| | | |
|---|---|---|
| EP | 1104977 A1 | 6/2001 |
| GB | 2374252 A | 10/2002 |
| JP | 2000358266 A * | 12/2000 |
| JP | 2001054162 A * | 2/2001 |
| JP | 2002-262330 | 9/2002 |

OTHER PUBLICATIONS

"3rd Generation Partnership Project; Technical Specificaiton Group Radio Access Network; RRC Protocol Specification (Release 1999)". 3G TS 25.331 V3.2.0 (Mar. 2000).*

Supplementary European Search Report dated Nov. 9, 2010 received in corresponding European Patent Application No. 04747597.5-2411/1768433 PCT/JP2004010131.

* cited by examiner

*Primary Examiner* — Kent Chang
*Assistant Examiner* — Kashif Siddiqui
(74) *Attorney, Agent, or Firm* — Murphy & King, P.C.

(57) ABSTRACT

A disclosed wireless base station forms a cell adjacent to an adjacent cell formed by an adjacent wireless base station in a mobile communication system. A notification unit notifies time difference information into the cell formed by the wireless base station itself. The time difference information indicates a difference between a predetermined frame transmitted from the wireless base station itself and an adjacent predetermined frame transmitted from the adjacent wireless base station.

6 Claims, 5 Drawing Sheets

WIRELESS BASE STATION AND MOBILE STATION

CROSS-REFERENCE TO RELATED APPLICATIONS

This application is a U.S. continuation application filed under 35 USC 111(a) claiming benefit under 35 USC 120 and 365(c) of PCT application JP04/010131, filed Jul. 15, 2004. The foregoing applications are hereby incorporated herein by reference.

BACKGROUND OF THE INVENTION

1. Field of the Invention

The present invention relates to a wireless base station and a mobile station in a mobile communication system.

2. Description of the Related Art

A mobile communication system includes plural wireless base stations, and each wireless base station forms a cell. A mobile station can perform communications by being within a cell. When the mobile station moves from one cell to another cell, a hand over process is executed between wireless base stations, so that the mobile station can continue communicating while moving from one cell to another.

FIG. 1 illustrates a frame configuration of a signal (e.g., CPICH: Common Pilot Channel, PCCPCH: Primary Common Control Physical Channel) that a mobile station receives from a wireless base station. Each frame corresponds to, e.g., 10 ms, and a system frame or a super frame is formed of 4,096 frames. The CPICH is a channel providing a reference timing in a cell, and the PCCPCH is transmitted in synchronization with the CPICH.

Next, a description is given of movements of the mobile station between cells in a standby status.

When power is turned on, the status of the mobile station becomes a standby status in a cell (serving cell) in which the mobile station is located. The mobile station periodically (intermittently) receives outgoing signals (e.g., CPICH, PICH: Page Indication Channel) from the wireless base station forming the cell. That is, in the standby state, the mobile station does not need to constantly receive signals; while the mobile station is in an energy-saving mode, the mobile station can measure levels of signals in the serving cell with CPICH and check whether a signal is sent to the mobile-station with PICH.

When the mobile station determines that it has come to an edge of the serving cell by detecting a decrease in the reception level of the CPICH of the serving cell, the mobile station executes a three-stage cell search (process of establishing frame synchronization using P-SCH, S-SCH, CPICH).

When the mobile station receives from an adjacent cell a CPICH having a sufficient reception level compared to the CPICH of the serving cell, a transfer process of standby zones is executed. Specifically, the cell to which the mobile station belongs is switched to be the adjacent cell, so that the status of the mobile station switches to a standby status for an adjacent wireless base station (also referred to as switching the cell of standby object).

When the object of standby is switched, it is necessary to acquire standby conditions in the new cell by receiving notification information (information received via the PCCPCH).

FIG. 2 illustrates a configuration of transmission information of the PCCPCH.

As shown in FIG. 2, each notification information index and each piece of notification information forms an information block corresponding to one unit of information. Two of the frames shown in FIG. 1 form one information block. For example, a block corresponding to an even number frame shown in FIG. 1 (e.g., #0) and an odd number frame shown in FIG. 1 (e.g., #1) is an information block index (#0). Encoding is performed in units of information blocks, so that one frame number is loaded in each information block. For example, in the information block corresponding to the frames #0 and #1 shown in FIG. 1, only the even frame number #0 is loaded.

Next, information sent to the mobile station is briefly described.

The notification information index indicates the type and the location of information included in the PCCPCH. For example, the notification information indices are sent in information blocks holding frame numbers that are multiples of 8, and are periodically transmitted every 80 ms.

The mobile station receives one information block of PCCPCH starting from a beginning tc of a frame that is detected by cell search, and identifies a frame number included in the information received (in this example, #4). The mobile station then determines whether the identified frame number is a multiple of eight, i.e., whether a notification information index is included. When the frame number is not a multiple of eight, the mobile station calculates a timing (tA) when the first frame (in this example, #8) having a frame number that is a multiple of eight can be received, among succeeding frames. The mobile station receives an information block again at the timing tA.

Based on the notification information index received at the timing tA, the mobile station calculates a timing (tB) when an information block holding information necessary for the standby can be received. The mobile station receives an information block at the timing tB. The information block received at the timing tB holds information about standby conditions, etc. Based on this information, the mobile station can transfer to a standby status for the adjacent wireless base station.

The mobile station synchronizes with frames (CPICH, PCCPCH) sent from the adjacent wireless base station. However, it cannot be determined whether to start receiving a frame of an even number or an odd number. Accordingly, the mobile station might start receiving a frame from a time point t'C.

However, as described above, encoding is performed in units of two frames. An information block cannot be decoded if the mobile station starts receiving a frame from the time point t'C. Thus, the mobile station receives information corresponding to 20 ms starting from t'C, and also receives information corresponding to 20 ms starting from tC, where tC is 10 ms after t'C. Among these two sets of information received, a frame number (even number) is extracted from the set of information that is decoded successfully.

Next, a description is given of a hand over operation by which a mobile station communicating in one cell moves to another cell, with reference to FIG. 3.

In response to a timeout of a timer of a predetermined time, the mobile station executes a three-stage cell search as described above to establish frame synchronization with a wireless base station that is a soft hand over destination. The mobile station receives two frames of PCCPCH from the adjacent wireless base station and acquires a frame number to be prepared for the hand over beforehand. The hand over is not performed until the reception level of CPICH of the hand over destination becomes sufficient. However, it is necessary to be prepared beforehand so that communications are not disconnected when the mobile station is moving at high speed.

The frame number is acquired to adjust the timing of receiving the same data from the hand off source and the hand off destination.

Accordingly, the mobile station calculates a timing difference (t off) between the received frame and a frame of an outgoing data channel from the wireless base station of the soft hand over source having the same frame number as that acquired via the PCCPCH of the adjacent wireless base station. This time difference t off is notified to the wireless base station of the hand off source as offset information. It is assumed that the PCCPCH of the wireless base station of the soft hand over source and the outgoing data channel from the wireless base station of the soft hand over source have an offset of t off.

The wireless base station of the hand off source transfers the offset information (t off) received from the mobile station to a wireless base station controller (RNC: Radio Network Controller), which is an upper level device. According to instructions from the RNC (according to the time difference t off), the wireless base station of the hand off destination transmits data such that the transmission timing of an outgoing data channel to the mobile station synchronizes with the transmission timing of the data channel of the hand off source.

Accordingly, the mode of the mobile station changes to a soft hand over mode, in which the same data can be simultaneously received from the wireless base station of the hand off source and the wireless base station of the hand off destination.

As described above, when the mobile station moves to another cell (hand over) in the standby status, or when the mobile station is handed over between cells while performing communication, the mobile station needs to execute a three-stage cell search and acquire a number from a frame received from the wireless base station of the destination. Accordingly, the processing workload is increased.

In order to reduce the processing workload, there is a method of including a reference time difference RTD in the notification information. The reference time difference RTD is the time difference between a frame transmitted in the source cell and an immediate frame transmitted in the destination cell that is the adjacent cell (i.e., a time difference between arbitrary frames).

Specifically, the mobile station receives the RTD from the source cell, obtains a timing that is delayed from a frame of the source cell by the RTD, and applies the obtained timing as the frame timing of the adjacent cell. Accordingly, the three-stage cell search can be omitted. The conventional technology of using the reference time difference RTD for detecting the position of the mobile station is disclosed in, for example, Japanese Laid-Open Patent Application No. 2002-262330.

The processing workload of the cell search can be reduced by using the RTD. However, to move to another cell in a standby status, the mobile station needs to actually receive a frame transmitted from the destination cell, identify a frame holding necessary information based on a frame number included in the received data, and receive the identified frame. This processing workload cannot be reduced.

Furthermore, when a hand over is to be performed while the mobile station is communicating, the mobile station needs to actually receive a frame transmitted from the destination cell and measure the difference between a frame of the source cell having the same frame number. This processing workload cannot be reduced.

SUMMARY OF THE INVENTION

The present invention provides a wireless base station and a mobile station in which one or more of the above-described disadvantages is eliminated.

A preferred embodiment of the present invention further reduces the processing workload on a mobile station. More particularly, a preferred embodiment of the present invention reduces processes required for acquiring information necessary for handing over the mobile station in a standby status, or processes required until acquiring the necessary information.

An embodiment of the present invention provides a wireless base station forming a cell adjacent to an adjacent cell formed by an adjacent wireless base station in a mobile communication system, the wireless base station including a notification unit configured to notify time difference information into the cell formed by the wireless base station itself, wherein the time difference information indicates a difference between a predetermined frame transmitted from the wireless base station itself and an adjacent predetermined frame transmitted from the adjacent wireless base station.

An embodiment of the present invention provides a mobile station used in a mobile communication system, the mobile station including an acquiring unit configured to acquire time difference information from notification information transmitted into a first cell in which the mobile station is located, wherein the time difference information indicates a difference between a predetermined frame transmitted into the first cell and an adjacent predetermined frame transmitted into a second cell adjacent to the first cell; and a receiving unit configured to receive notification information transmitted into the second cell based on a timing of a frame transmitted into the first cell and the time difference information acquired by the acquiring unit.

An embodiment of the present invention provides a mobile station used in a mobile communication system, the mobile station including an acquiring unit configured to acquire time difference information from notification information transmitted into a first cell in which the mobile station is located, wherein the time difference information indicates a difference between a predetermined frame transmitted into the first cell and an adjacent predetermined frame transmitted into a second cell adjacent to the first cell; and a transmitting unit configured to transmit offset information based on the time difference information acquired by the acquiring unit and a frame timing of an outgoing data channel received in the first cell.

According to one embodiment of the present invention, the processing workload on a mobile station is further reduced.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of an embodiment of the present invention.

First Embodiment

Figure 4:
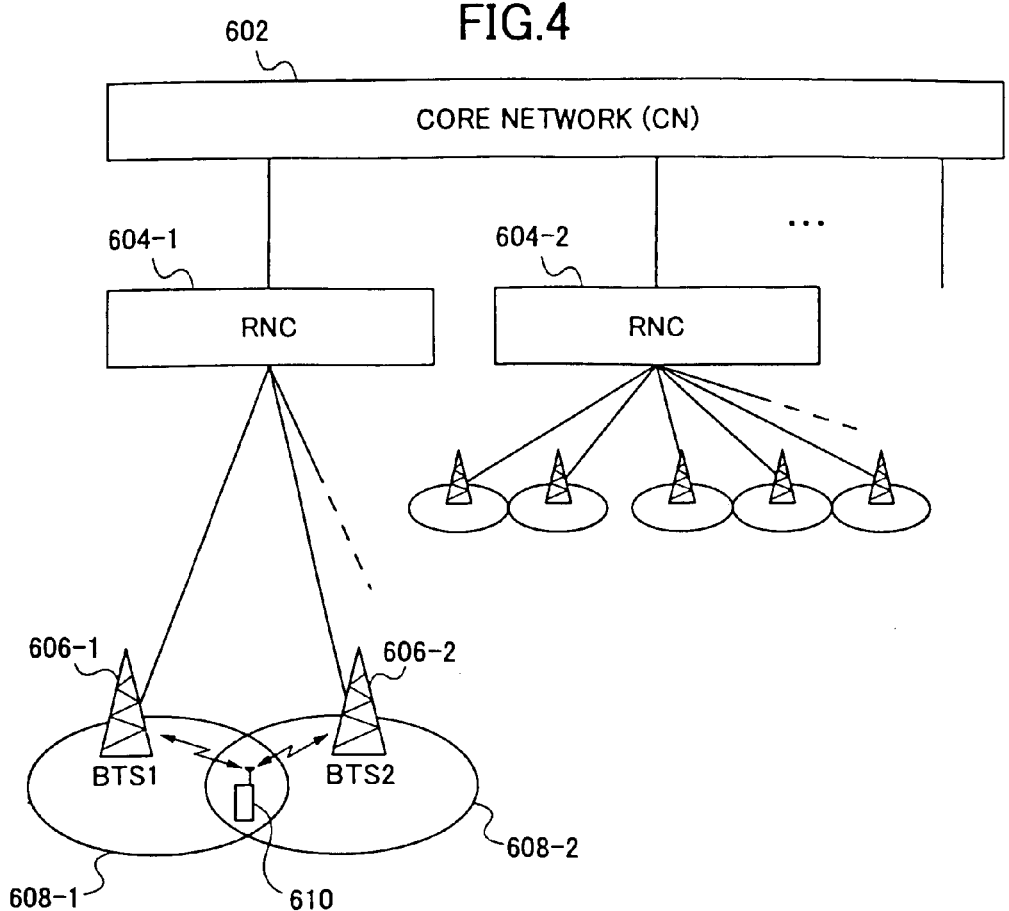
FIG. 4 is a wireless communication system according to a first embodiment of the present invention.

FIG. 4 is a wireless communication system according to a first embodiment of the present invention. The wireless communication system includes a core network (CN) 602, plural wireless base station controllers (RNC: Radio Network Controller) 604-1, 604-2, plural wireless base stations 601-1 (BTS1), 606-2 (BTS2), and a mobile station 610. The wireless base stations 601-1, 606-2 form cells 608-1, 608-2, respectively. It is illustrated so that it appears as if one base station forms one cell as a matter of simplification; however, a cell can be divided into plural sectors. Furthermore, there can be more or fewer wireless base station controllers and wireless base stations.

The core network 602 performs service control including movement management, call control, and exchange functions.

The wireless base station controllers 604-1, 604-2, and so forth, control the plural wireless base stations 606-1, 606-2, and so forth, manage wireless resources, control wireless access, etc. The wireless base station controllers provide the above-described RTD to the wireless base stations so as to be transmitted from the wireless base stations. In addition to or instead of the above, the wireless base station controllers according to the first embodiment of the present invention provide a time difference (SF_RTD) between a predetermined frame transmitted from a wireless base station and a predetermined frame transmitted from an adjacent wireless base station, so as to be transmitted as notification information from the wireless base station. RTD is a time difference between arbitrary frames of adjacent wireless base stations, whereas SF_RTD is a time difference between predetermined frames of adjacent wireless base stations.

Figure 5:
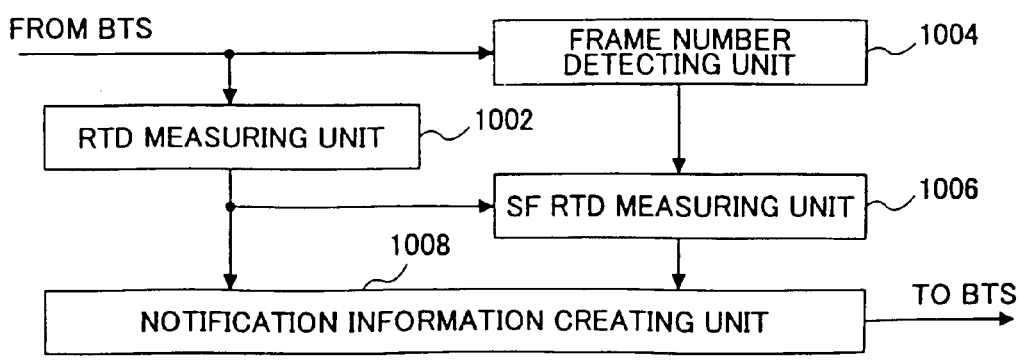
FIG. 5 is a partial functional block diagram of a wireless base station controller.

FIG. 5 is a partial functional block diagram illustrating the above-described functions of the wireless base station controller. As shown in FIG. 5, the wireless base station controller includes a reference time difference measuring unit (RTD measuring unit) 1002, a frame number detecting unit 1004, a system frame time difference measuring unit (SF_RTD measuring unit) 1006, and a notification information creating unit 1008. A signal received from a wireless base station (BTS) controlled by the wireless base station controller is provided to the RTD measuring unit 1002. The RTD measuring unit 1002 measures the time difference between an immediate frame of a different wireless base station, and outputs the measurement result as a reference time difference RTD. The signal received from the wireless base station (BTS) controlled by the wireless base station controller is also provided to the frame number detecting unit 1004. The frame number detecting unit 1004 detects the frame numbers of the individual frames in the received signal, and provides the detection result to the SF_RTD measuring unit 1006.

The SF_RTD measuring unit 1006 measures the time difference between predetermined frames, and outputs the measurement result as a system frame time difference SF_RTD. One measuring method is to notify the transmission time of the beginning of the system frames and to obtain the time difference therebetween.

For example, the SF_RTD corresponds to a time difference between a start timing of the head frame in a system frame sent from a wireless base station and a start timing of the head frame in a system frame sent from an adjacent wireless base station. In other words, the SF_RTD is a time difference between two frames having the same frame number (e.g., frame number #0), among frames in system frames sent from a wireless base station and an adjacent a wireless base station.

The predetermined frame can be a frame holding a notification information index. For example, the SF_RTD can be the time difference between a frame including a notification information index sent from a source cell and an immediate frame including a notification information index sent from a destination cell. The difference between the system frames may have an uncertain element; however, the mobile station can immediately receive the immediate frame holding the notification information index of the adjacent cell by using as a reference the frame holding the notification information index of the source cell.

The notification information creating unit 1008 creates notification information including the measured RTD and SF_RTD, and sends the notification information to the wireless base station controlled by the wireless base station controller.

Figure 2:
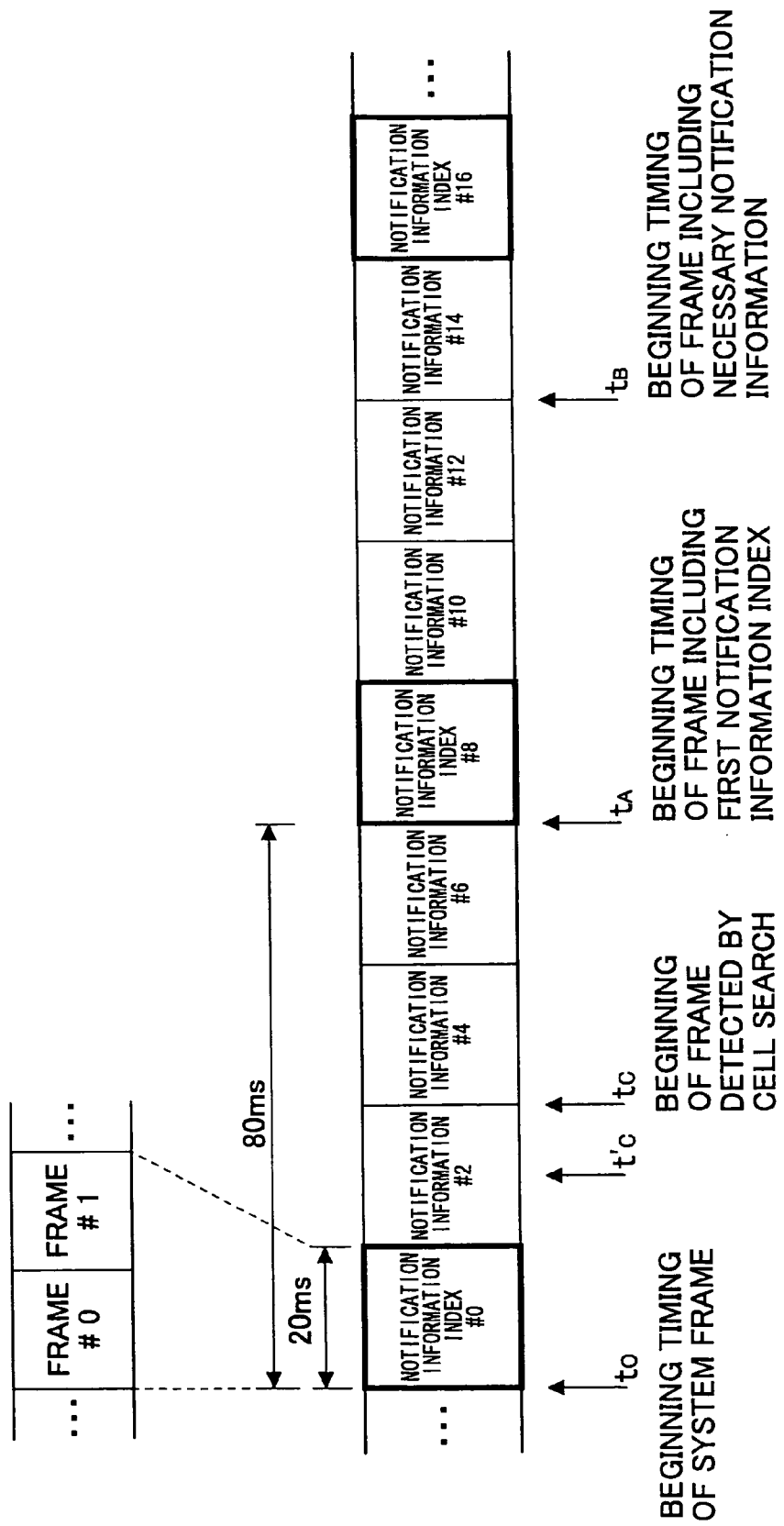
FIG. 2 illustrates a configuration of transmission information of the PCCPCH.

Referring back to FIG. 4, the wireless base stations 601-1, 606-2, and so forth communicate with mobile stations within their respective cells through a wireless link. The PCCPCH transmitted to the mobile station has the configuration of the information shown in FIG. 2, and is transmitted according to the configuration.

Figure 6:
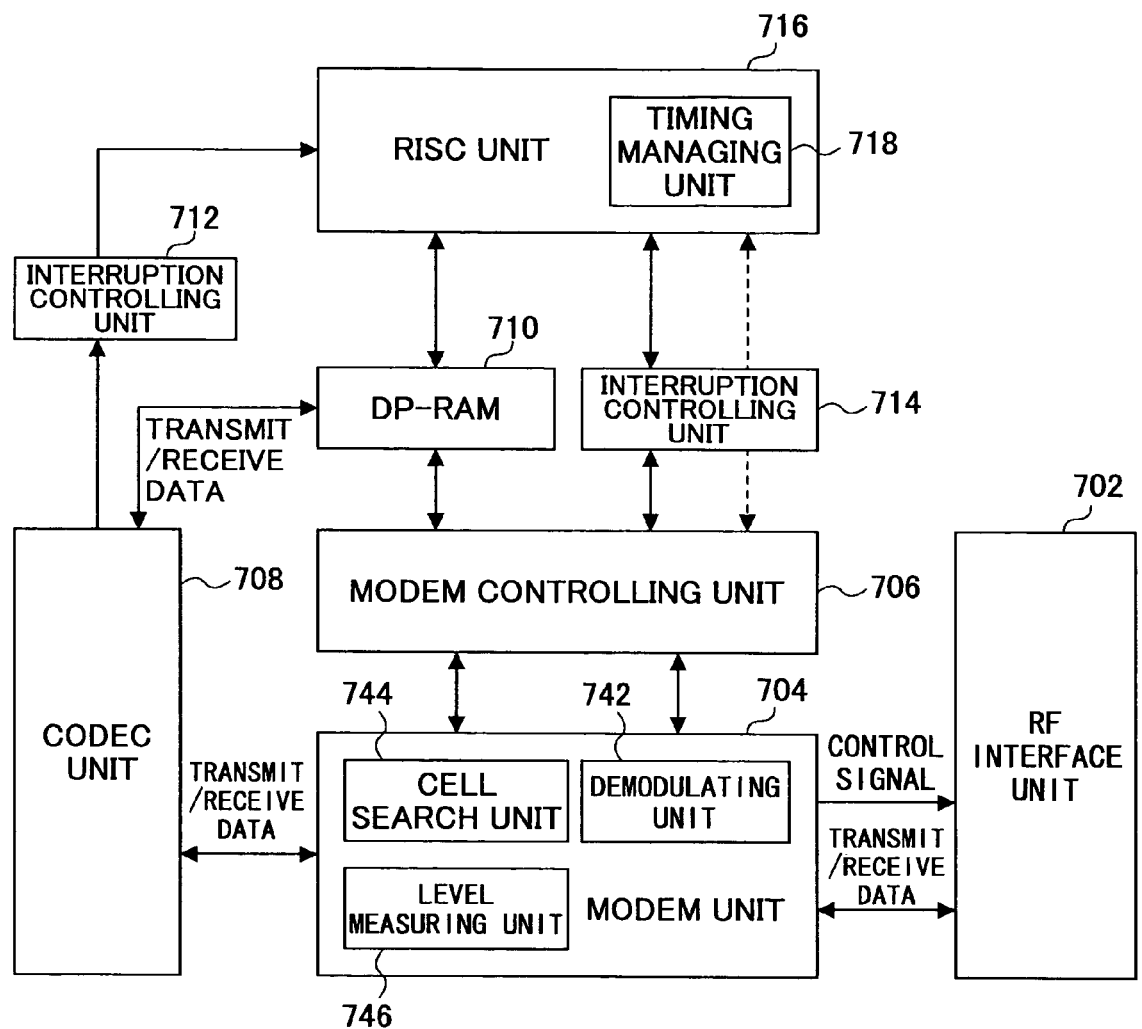
FIG. 6 is a detailed functional block diagram of the mobile station.

FIG. 6 is a detailed functional block diagram of the mobile station 610. The mobile station 610 includes an RF interface unit 702, a modem unit 704, a modem controlling unit 706, a codec unit 708, a dual port RAM 710, interruption controlling units 712, 714, and a RISC unit 716. The modem unit 704 includes a demodulating unit 742, a cell search unit 744, and a level measuring unit 746. The RISC unit 716 includes a timing managing unit 718.

The RF interface unit 702 transmits/receives signals to/from wireless base stations such as those denoted by 606-1, 606-2 in FIG. 4.

The modem unit 704 performs modulation and demodulation of signals transmitted/received by the mobile station 610. The demodulating unit 742 demodulates signals transmitted by a channel such as PCCPCH, and provides the demodulated signals to the codec unit 708. The level measuring unit 746 measures signal levels (e.g., RSSI: Received Signal Strength Indicator) of signals from the cell in which the mobile station 610 is located and from surrounding cells. The cell search unit 744 performs the three-stage cell search in a standby stage and during communication, acquires a frame timing of an adjacent cell, and sends the acquired frame timing to the level measuring unit 746.

The modem controlling unit 706 controls operations of functional elements in the modem unit 704, while communicating with the RISC unit 716 and the dual port RAM 710. For example, the modem controlling unit 706 sets a parameter of a functional element in the modem unit 704 to be a value instructed by the RISC unit 716. Further, the modem controlling unit 706 notifies the RISC unit 716 of reception levels of signals from surrounding cells measured by the level measuring unit 746.

The codec unit 708 performs error-correction decoding and error detection on the signals received and decoded. For example, when the received data are turbo-encoded, turbo-decoding is performed. The turbo-decoded data are checked by performing CRC (Cyclic Redundancy Check). The codec unit 708 loads decoded data into the dual port RAM 710 when error detection results thereof are positive (errors included in signals are within a permissible range). When error detection results are negative, the decoded data are discarded. The codec unit 708 performs error-correction encoding on signals received. When signal contents are loaded in the dual port RAM 710, the codec unit 708 activates the interruption controlling unit 712 and provides a trigger to the RISC unit 716.

The dual port RAM 710 holds signals decoded and loaded therein. The dual port RAM 710 has a bi-directional port so as to communicate with the RISC unit 716 and the modem controlling unit 706.

The RISC unit 716 controls all functional elements in the mobile station 610. The RISC unit 716 extracts signal contents from the dual port RAM 710, decodes the signal contents, and notifies the signal contents to a layer 3 that manages cell information. The RISC unit 716 outputs signals for controlling function elements controlled by the RISC unit 716, according to instructions from the layer 3.

The timing managing unit 718 acquires from the codec unit 708, the RTD and the SF_RTD received via the PCCPCH, and holds the acquired RTD and SF_RTD. The timing managing unit 718 also manages and stores a frame timing of the serving cell and surrounding cells.

Next, operations performed in the standby status and during communications are described in this order.

"Changing Cell of Standby Object"

A description is given of an operation performed by the mobile station 610 for switching the cell of standby object.

An example in which the mobile station 610 moves from the cell 608-1 of the BTS1 to the cell 608-2 of the BTS2 is described with reference to FIG. 4.

When the mobile station 610 is within the cell 608-1 and the BTS1 is selected as the standby object BTS, the mobile station 610 periodically receives PICH (Paging Indicator Channel) and CPICH from the BTS1.

Figure 1:
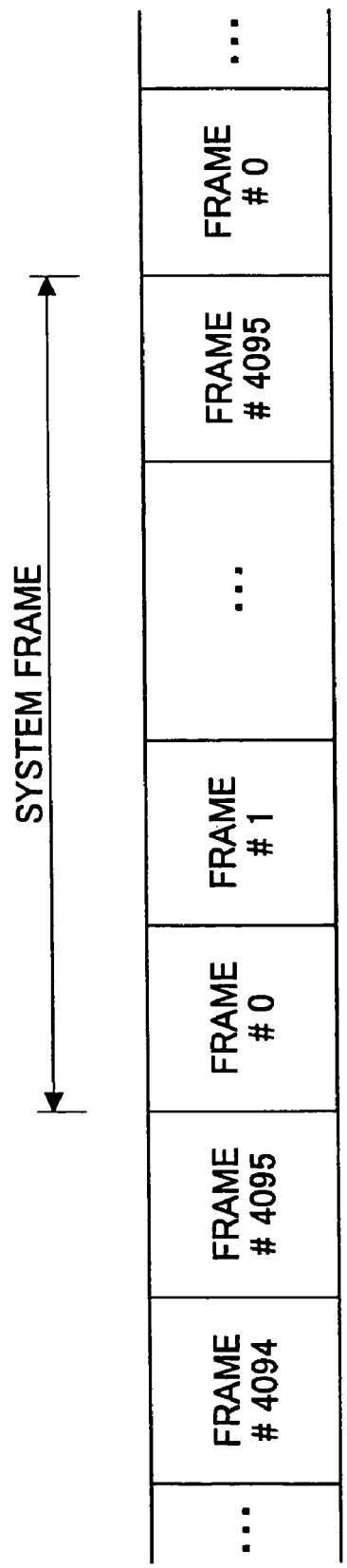
FIG. 1 illustrates a frame configuration of a CPICH sent from a wireless base station.

This is the same as periodically receiving a PICH that the mobile station 610 needs to receive from among the frames shown in FIG. 1. Accordingly, the mobile station 610 manages the beginning timing of a system frame received from the BTS1 at the timing managing unit 718. The timing is managed by storing a reference time generated in the mobile station 610.

Further, as described above, the timing managing unit 718 holds the RTD and SF_RTD received via the PCCPCH that is the notification channel of the BTS1.

Accordingly, when switching from the BTS1 to the BTS2, the mobile station 610 calculates a timing that is shifted (delayed) from the beginning of a system frame of the BTS1 managed by the timing managing unit 718 by a time indicated by the SF_RTD. At the calculated timing, the mobile station 610 receives CPICH from the BTS2, measures the reception level thereof, and also receives a part of PCCPCH corresponding to the notification information index (assumed to be loaded in the head frame for each cell).

When the transmission cycle of the notification information index is the same for both base stations, the timings at which notification information indices are received from the BTS1 are stored in the timing managing unit 718. Accordingly, the notification information indices can be directly received from the BTS2 by receiving them at timings shifted from the timings stored in the timing managing unit 718 by the SF_RTD. It is obvious that the SF_RTD need not indicate a time difference between system frames; it is sufficient if the SF_RTD indicates the (minimum) time difference between frames sending notification information indices.

If the frame numbers including standby conditions are the same in both PCCPCHs of the BTS1 and the BTS2, when standby conditions for the BTS1 are received, the frame number thereof is stored. Accordingly, standby conditions can be directly received from the BTS2 by receiving them at a timing shifted from the timing of the frame having the stored frame number by the SF_RTD.

As described above, according to the first embodiment, standby conditions can be received with reduced processing workload on the mobile station.

"Hand Over"

The mobile station 610 previously receives the PCCPCH from the base station BTS1 that is the hand over source, acquires the SF_RTD included in the received information, and stores it in the timing managing unit 718. In response to a decrease in the reception level of the CPICH of the serving cell, the mobile station 610 calculates a timing shifted (delayed) from the beginning of the system frame of the BTS1 managed by the timing managing unit 718 by a time indicated by the SF_RTD. At the calculated timing, the mobile station 610 receives the CPICH from the BTS2, and measures the reception level thereof with the level measuring unit 746. When the reception quality of the CPICH from the BTS2 is better than that of the CPICH from the BTS1 according to measurements by the level measuring unit 746, the measurement results are notified to the BTS1. Preferably, at this point or at a subsequent point when the BTS1 actually notifies that the hand over destination is the BTS2, the mobile station 610 reads the acquired SF_RTD from the timing managing unit 718, calculates the difference between the SF_RTD and the time difference t off between the head frame (#0) of the outgoing data channel held in the timing managing unit 718 and the head frame (#0) of the PCCPCH, and sends the calculated value as offset information to the BTS1.

Figure 3:
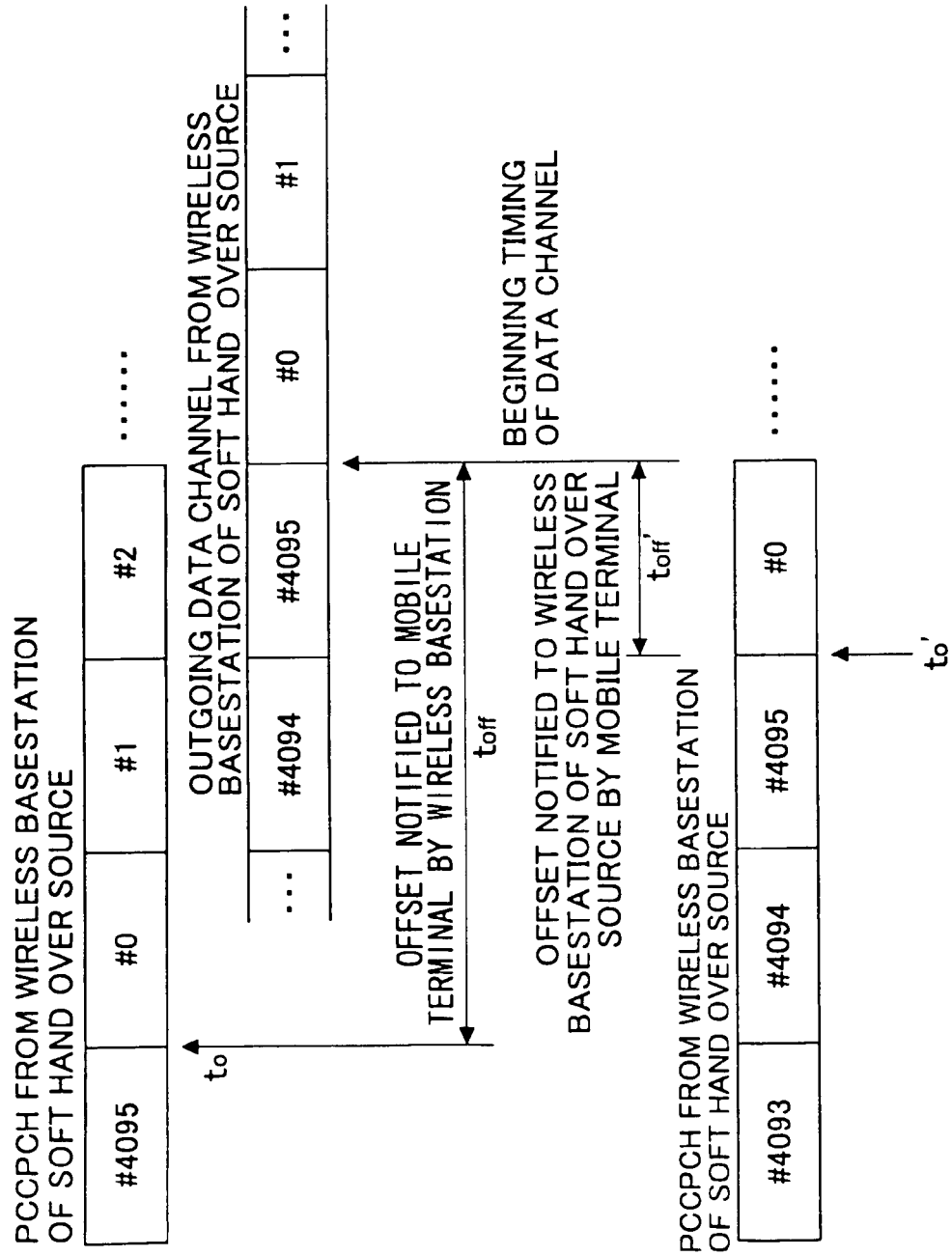
FIG. 3 illustrates a calculation method of an offset necessary for performing hand over.

With reference to FIG. 3, t off' is obtained by subtracting the SF_RTD from t off.

Thus, the processing workload of receiving the PCCPCH from the BTS2, identifying a frame number, and calculating the difference between a corresponding frame in the outgoing data channel from the BTS1 can be omitted for the mobile station 610.

Second Embodiment

The SF_RTD used in the first embodiment is not measured by the mobile station 610 but is received from the wireless base station controller RNC.

Therefore, there may be an error in the SF_RTD acquired by the mobile station 610 caused by time delays due to the distance between the mobile station 610 and the base station. In a second embodiment according to the present invention, such an error is corrected. According to the second embodiment, a start timing SFT_b of a system frame at the destination cell is obtained as follows.

(1) When MFT_a>MFT_b,
SFT_b=SFT_a+SF_RTD_b+(MFT_b−MFT_a+Nc)−(SF_RTD_b % Nc)
(2) When MFT_a<MFT_b,
SFT_b=SFT_a+SF_RTD_b+(MFT_b−MFT_a)−(SF_RTD_b % Nc)
The symbols have the following meanings.

| | |
|---|---|
| MFT_a: | Time difference between frame boundary of frame received from wireless base station |

| | |
|---|---|
| | of source cell a and reference time point of system frame time of mobile station. |
| MFT_b: | Time difference between frame boundary of frame received from wireless base station of destination cell b and reference time point of system frame time of mobile station. |
| SFT_a: | Start timing of system frame regarding source cell a. |
| SFT_b: | Start timing of system frame regarding destination cell b. |
| SF_RTD_b: | System frame time difference with respect to destination cell b notified by RNC. |
| Nc: | Number of chips included in one frame (38,400 chips). |
| A % B: | The remainder after dividing A with B. For example, the numbers of chips are as follows: |
| SFT_a: | 38,800 chips |
| MFT_a: | 400 chips |
| MFT_b: | 500 chips |
| Nc: | 38,400 chips |

SF_RTD_b is actually 38,500 chips; however, due to an error, the mobile station 610 receives the SF_RTD_b as being 38,600. If no corrections are made, the start timing SFT_b of the system frame regarding the destination cell b becomes as follows: SFT_b=38,800+38,600=77,400 chips By performing the above correction, the error is appropriately corrected as follows: SFT_b=38,800+38,600+(500−400)−(38,600%38,400)=38,800+38,500=77,300

The present invention is not limited to the specifically disclosed embodiment, and variations and modifications may be made without departing from the scope of the present invention.

This application is a U.S. continuation application filed under 35 USC 111(a) claiming benefit under 35 USC 120 and 365(c) of PCT application JP2004/010131, filed Jul. 15, 2004. The foregoing application is hereby incorporated herein by reference.

What is claimed is:

1. A wireless base station connected, via a wireless base station controller, with another wireless base station that forms another cell adjacent to a cell that is formed by the wireless base station, the wireless base station comprising:
a notification unit configured to notify time difference information that is measured by the wireless base station controller to a mobile station located in the cell formed by the wireless base station, wherein the time difference information indicates a time difference between a predetermined frame transmitted from the wireless base station and another predetermined frame transmitted from the another wireless base station, and configured to report the time difference information indicating a time difference RTD between arbitrary frames for the cell search and a time difference SF_RTD between frames having the same frame number for the handover, which are measured by the wireless base station controller.

2. The wireless base station according to claim 1, wherein the predetermined frame transmitted from the wireless base station and the another predetermined frame transmitted from the another wireless base station have the same frame numbers.

3. The wireless base station according to claim 1, wherein the predetermined frame transmitted from the wireless base station and the another predetermined frame transmitted from the another wireless base station both include notification information index information.

4. A mobile station used in a mobile communication system, the mobile station comprising:
an acquiring unit configured to acquire time difference information from notification information transmitted into a first cell in which the mobile station is located, wherein the time difference information indicates a time difference between a predetermined frame transmitted into the first cell and another predetermined frame transmitted into a second cell adjacent to the first cell, and is measured by a wireless base station controller that manages the first cell and the second cell, and acquires a time difference SR_RTD from the time difference information measured by a wireless base station controller that manages the first cell and the second cell; and
a receiving unit configured to receive notification information transmitted into the second cell based on a timing of a frame transmitted into the first cell and the time difference information acquired by the acquiring unit, wherein the time difference information indicates a time difference RTD and a time difference SF_RTD.

5. A mobile station used in a mobile communication system, the mobile station comprising:
an acquiring unit configured to acquire time difference information from notification information transmitted into a first cell in which the mobile station is located, wherein the time difference information indicates a time difference between a predetermined frame transmitted into the first cell and another predetermined frame transmitted into a second cell adjacent to the first cell, and is measured by a wireless base station controller that manages the first cell and the second cell, and acquires a time difference SR_RTD from the time difference information measured by a wireless base station controller that manages the first cell and the second cell; and
a transmitting unit configured to transmit offset information based on the time difference information acquired by the acquiring unit and a frame timing of an outgoing data channel received in the first cell, wherein the time difference information indicates a time difference RTD and a time difference SF_RTD.

6. A wireless base station controller comprising:
a reference time difference measuring unit configured to measure a time difference RTD between arbitrary frames for a cell search;
a frame number detection unit configured to detect frame numbers of frames;
a system frame time difference measuring configured to measure a time difference SF_RTD between frames having the same frame number for a handover; and
a notification information creating unit configured to create time difference information including the time difference RTD and the time difference SF_RTD that is measured by the wireless base station controller.

* * * * *